(12) United States Patent
Bandera et al.

(10) Patent No.: US 9,164,781 B2
(45) Date of Patent: Oct. 20, 2015

(54) CLIENT BUNDLE RESOURCE CREATION

(76) Inventors: Daniel Q. Bandera, Austin, TX (US);
Graham C. Charters, Hampshire (GB);
Jeremy P. J. Hughes, Hampshire (GB);
Timothy J. Ward, Southampton (GB)

( * ) Notice: Subject to any disclaimer, the term of this patent is extended or adjusted under 35 U.S.C. 154(b) by 803 days.

(21) Appl. No.: 13/432,275

(22) Filed: Mar. 28, 2012

(65) Prior Publication Data

US 2013/0019017 A1    Jan. 17, 2013

(30) Foreign Application Priority Data

Jul. 12, 2011    (EP) ..................................... 11173616

(51) Int. Cl.
*G06F 15/173*    (2006.01)
*G06F 9/445*    (2006.01)
*G06F 9/455*    (2006.01)

(52) U.S. Cl.
CPC ........ *G06F 9/44521* (2013.01); *G06F 9/45504* (2013.01)

(58) Field of Classification Search
CPC ................................................ H04L 29/08468
USPC ................................................ 709/225, 226
See application file for complete search history.

(56) References Cited

U.S. PATENT DOCUMENTS

| | | | |
|---|---|---|---|
| 7,721,003 | B2 | 5/2010 | Girle et al. |
| 2005/0193119 | A1 | 9/2005 | Hayes, Jr. |
| 2006/0218623 | A1 * | 9/2006 | Hodges et al. .................... 726/3 |
| 2009/0030979 | A1 | 1/2009 | Hayes, Jr. |
| 2009/0276769 | A1 | 11/2009 | Brannen, Jr. et al. |

OTHER PUBLICATIONS

Cover Pages; Standards for Automated Resource Management in the Computing Environment; Aug. 31, 2006; pp. 1-34.*
Dejan Glozic; PDE Road Map to OSGi-Compliance; Sep. 9, 2003; pp. 1-11.*
Standards for automated resource management in the computing environment.
OSGi Service Platform Release 4; Early Draft May 2011 dated May 16, 2011—Distribution and Feedback License, Version 2.0.

* cited by examiner

*Primary Examiner* — Glenford Madamba
(74) *Attorney, Agent, or Firm* — Prentiss Johnson; Edell, Shapiro & Finnan, LLC

(57) ABSTRACT

A first request for a bundle resource can be sent to a first location. A first response can be received that identifies a second location. The first response can be analyzed to identify the second location. A second request and a third request can be created for a metadata resource and for an artifact resource. The second request can be sent to the second location. The third request can be sent to a third location. A second response and a third response can be received. The second response can comprise the metadata resource. The third response can comprise the artifact resource. The second response can be evaluated to determine the metadata resource. The third response can be evaluated to determine the artifact resource. The bundle resource can be created.

25 Claims, 7 Drawing Sheets

| REQUIREMENT | RESOURCE | METADATA | ARTEFACT |
|---|---|---|---|
| REQUIREMENT_1 | RESOURCE_1 | M_SERVER_1 | C_SERVER_1 |
| REQUIREMENT_2 | RESOURCE_2 | M_SERVER_2 | C_SERVER_2 |
| REQUIREMENT_3 | RESOURCE_3 | R_SERVER_3 | |

*FIGURE 7*

CLIENT BUNDLE RESOURCE CREATION

CROSS-REFERENCE TO RELATED APPLICATIONS

This application claims priority to the EP Application No. 11173616.1, filed on Jul. 12, 2011.

BACKGROUND

The present invention relates to the field of accessing bundle resources and, more particularly, to creating a bundle resource at a client.

OSGi" is a modularity technology for Java. Within OSGi, a bundle is a unit of modularity. One example of a bundle is a raw artifact of a binary Java jar file with additional bundle metadata that describes the identity and externals of the bundle. Herein, the bundle is referred to as the "bundle resource", the raw artifact is referred to as the "artifact resource", and the metadata for the bundle referred to as the "metadata resource". Resources are also known as objects. (Java and all Java-based trademarks and logos are trademarks or registered trademarks of Oracle and/or its affiliates.)

There are a large number of Open Source Software (OSS) Java projects available that are not OSGi enabled. An example of such an OSS project is one that provides Plain Old Java Objects (POJO). A POJO is an ordinary Java object. If a user wants to use such a POJO in an OSGi framework, the user has to define the metadata resource and create a bundle resource by combining the original artifact resource with the new metadata resource.

Bundle repositories can be repositories of pre-bundlized jars. Some repositories are created for the purpose of helping users adopt OSGi. One example of a bundle repository is SpringSource Enterprise Bundle Repository. This allows users to search for bundles and download them for use in their builds/runtime. The EBR comprises artifacts under a vast array of OSS licenses.

The OSGi Bundle Repository (OBR) is an OSGi draft specification that defines how to use a bundle repository for resolution of bundle dependencies. There are two stages to this process:
1. Reasoning about metadata for a bundle (the actual raw artifact resource is not required at this point).
2. Downloading any binaries for the chosen bundle. The location of the binary artifacts can be held in the metadata in stage 1.

However, one problem with such an EBR is that some raw OSS artifact resources can affect the terms under which the metadata resources are provided to a user. Enterprise providers of EBRs want to be able to provide appropriate bundle resources to users, but want to keep the constituent parts of the bundle resources apart.

BRIEF SUMMARY

One aspect of the present invention can include a method, system, apparatus, and/or computer program product for creating a bundle resource at a client computer. In the aspect, a first request can be sent to a first location. The first request can comprise a request for the bundle resource. A first response can be received from the first location. The first response can identify a second location. In response to receiving the first response, the first response can be analyzed to identify the second location. A second request and a third request can be created. The second request can comprise a request for a metadata resource. The third request can comprise a request for an artifact resource. The second request can be sent to the second location. The third request can be sent to a third location. A second response and a third response can be received. The second response can comprise the metadata resource. The third response can comprise the artifact resource. The second response can be evaluated to determine the metadata resource. The third response can be evaluated to determine the artifact resource. The bundle resource can be created.

One aspect of the present invention can include a method, system, apparatus, and/or computer program product for managing a bundle resource at a server. A first request can be received from a client computer. The first request can comprise a request for the bundle resource. The first request can be examined to determine the bundle resource. A second location of a metadata resource associated with the bundle resource can be identified. A first response can be constructed. The first response can identify the second location. The first response can be sent.

BRIEF DESCRIPTION OF THE SEVERAL VIEWS OF THE DRAWINGS

FIG. 7 depicts an exemplary lookup table depicting information used in method of embodiments of the invention.

DETAILED DESCRIPTION

Figure 1:
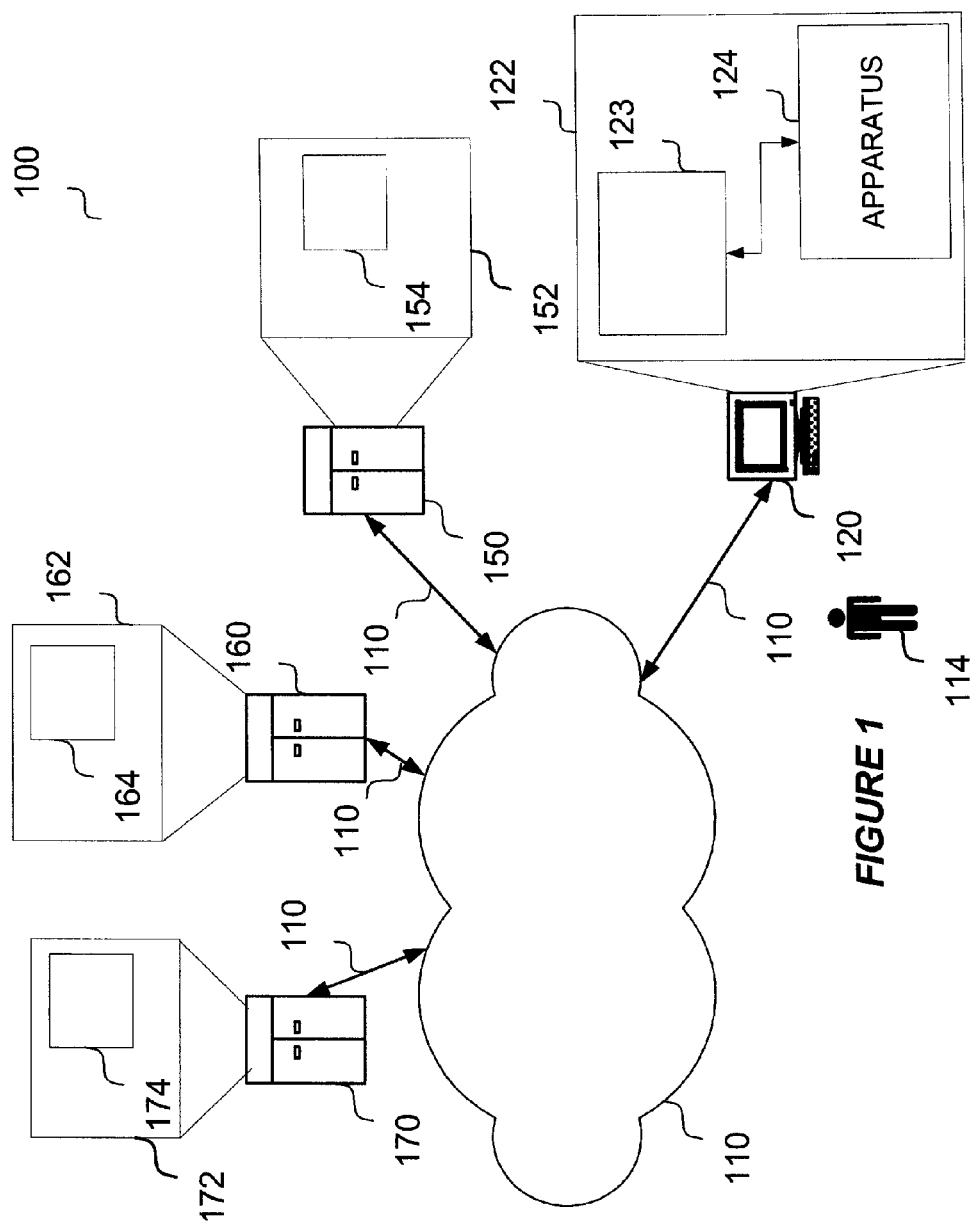
FIG. 1 is a block diagram depicting a data processing system, in accordance with the prior art, and in which an embodiment of the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Referring to the figures, FIG. 1 is a block diagram depicting a data processing system 100, in accordance with the prior art, and in which an embodiment of the present invention may be implemented. The data processing system comprises workstation 120, and servers 150, 160, 170. The workstation 120, and the servers 150, 160, 170 are connectable through a network 110.

An application 123 is connectable to a client apparatus 124 that controls bundle resources for applications 123 running in an operating system (OS) 122. Server 150 comprises a bundle repository program 154 running in an OS 152. Metadata server 160 comprises a metadata supply program 164 running in an OS 162, and artifact server 170 comprises an artifact file program 174 running in an OS 172. A user 114 interacts with the application 123 on the workstation 120.

Figure 2:
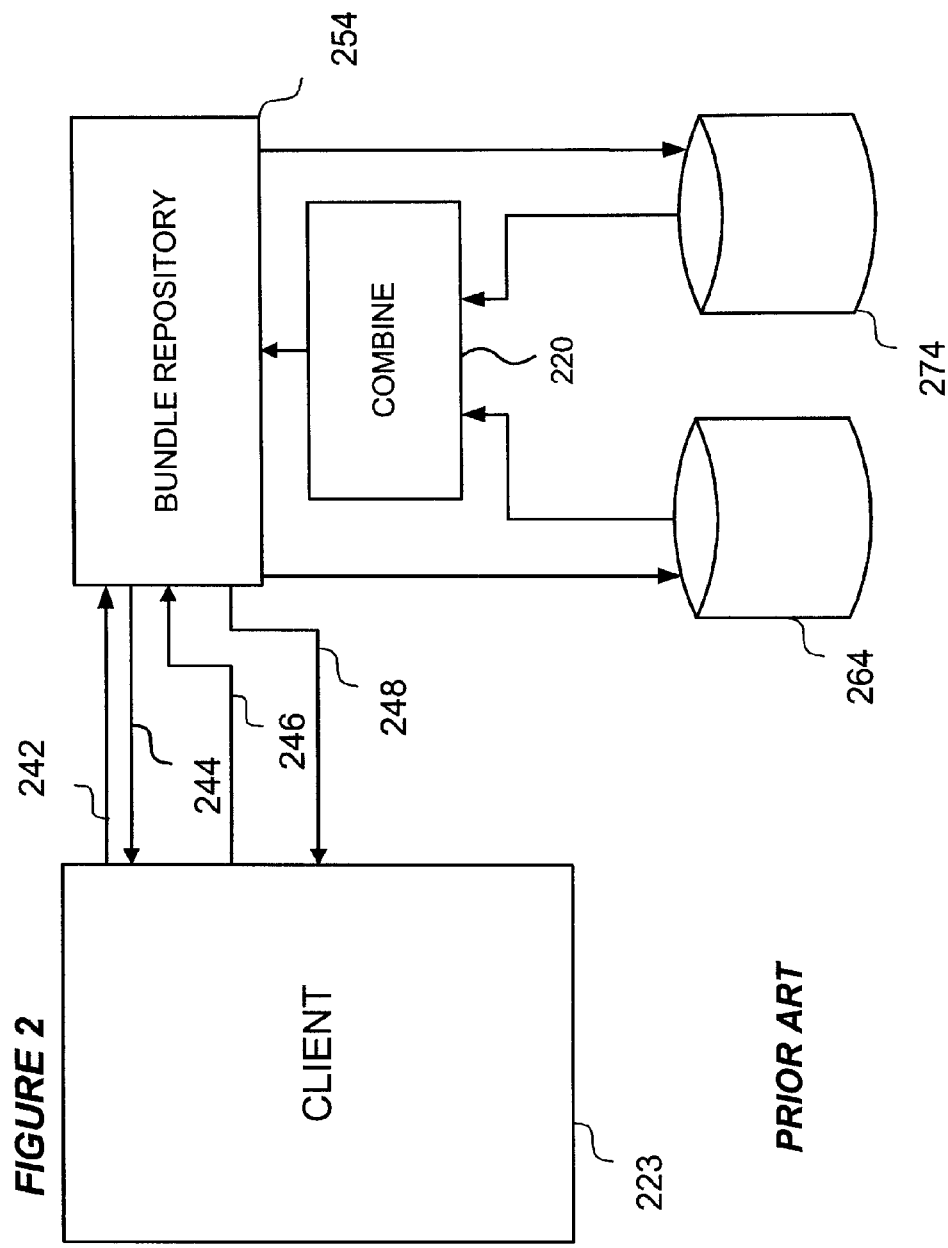
FIG. 2 is a block diagram depicting an interaction between a client application and a bundle repository, in accordance with the prior art.

FIG. 2 is a block diagram depicting an interaction between a client application 123, 223 and a bundle repository 154, 254, in accordance with the prior art. When a client application 123, 223 requires a bundle resource, a set of steps are carried out between the client application 123, 223 and the bundle repository 154, 254. At step 242, the client application 123, 223 sends a requirement to the bundle repository 154, 254 asking for a bundle resource that satisfies the requirement. The bundle repository 154, 254 processes the requirement request and finds a matching bundle resource description that satisfies the request. The bundle resource description comprises a uniform resource locator (URL) for obtaining the bundle resource. At step 244, the bundle repository 154, 254 responds with a description of the bundle resource. At step 246 the client application 123, 223 requests the bundle resource. In response to the resource request, the bundle repository 154, 254 sends requests to both a metadata server 164, 264, and an artifact server 174, 274. The metadata server 164, 264, and the artifact server 174, 274 provide the requested artifact resource and associated the metadata resource respectively to a combine component 220 for bundling. The bundle resource, comprising the metadata resource and the artifact resource, is provided to the bundle repository 154, 254. At step 248, the bundle resource is provided to the client application 123, 223 for consumption. Alternatively, the bundle repository may comprise a database of existing bundle resources that were combined previously. Also alternatively, the request for the bundle resource does not necessarily have to go back to the bundle repository, but to a different server.

Figure 3:
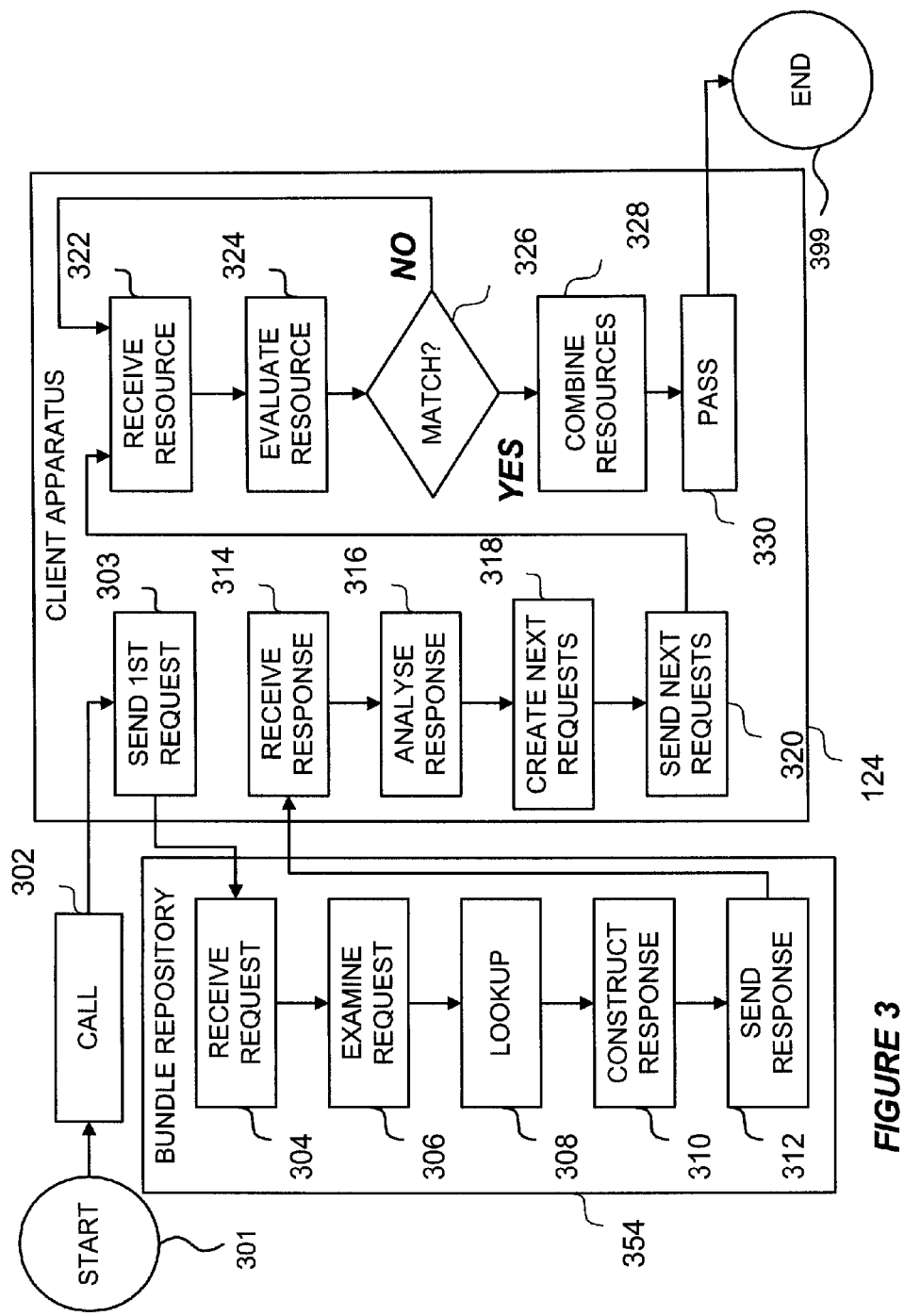
FIG. 3 is a high-level exemplary schematic flow diagram depicting operation method steps for requesting bundle resources, in accordance with an embodiment of the invention.
Figure 4:
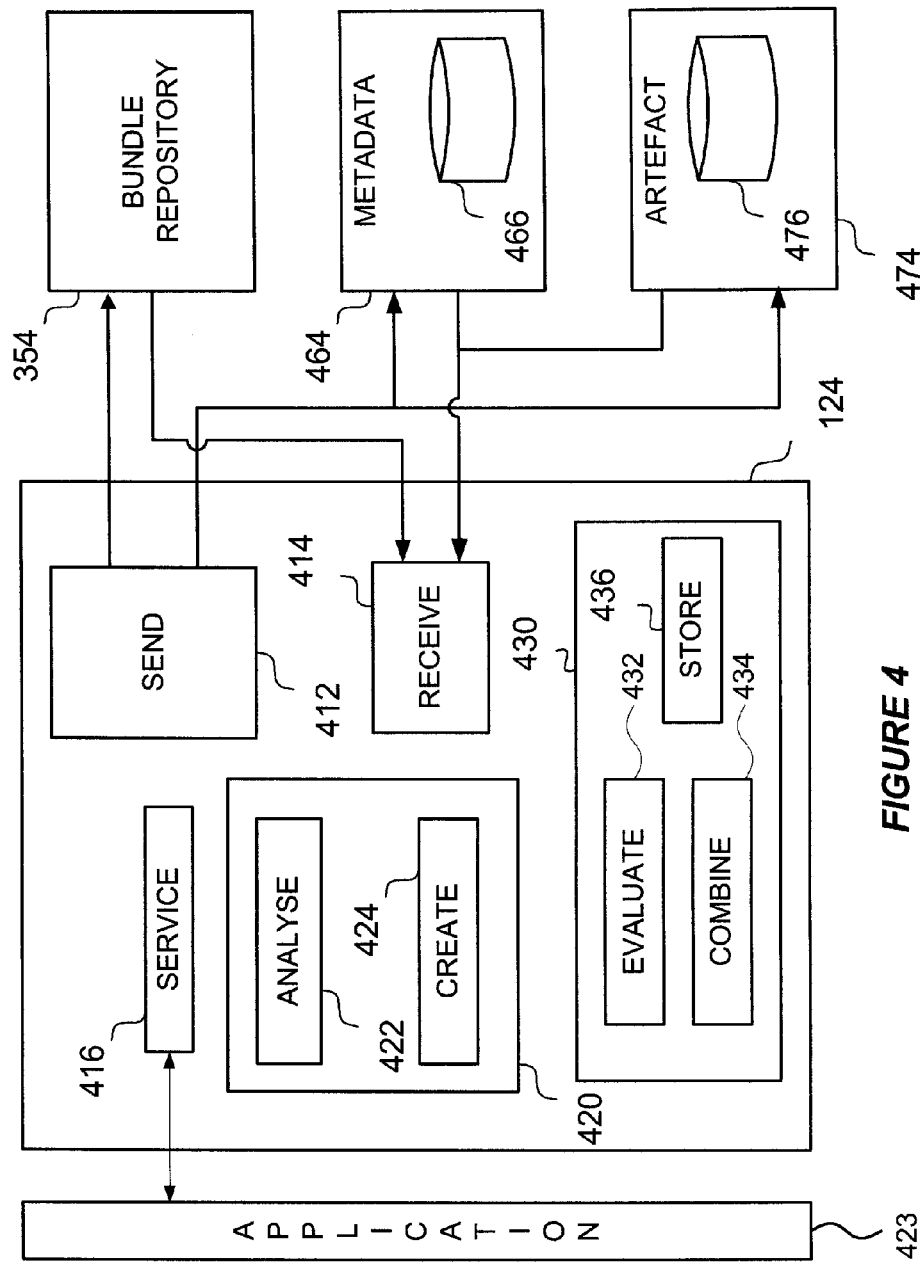
FIG. 4 depicts system components used in embodiments of the invention.
Figure 5:
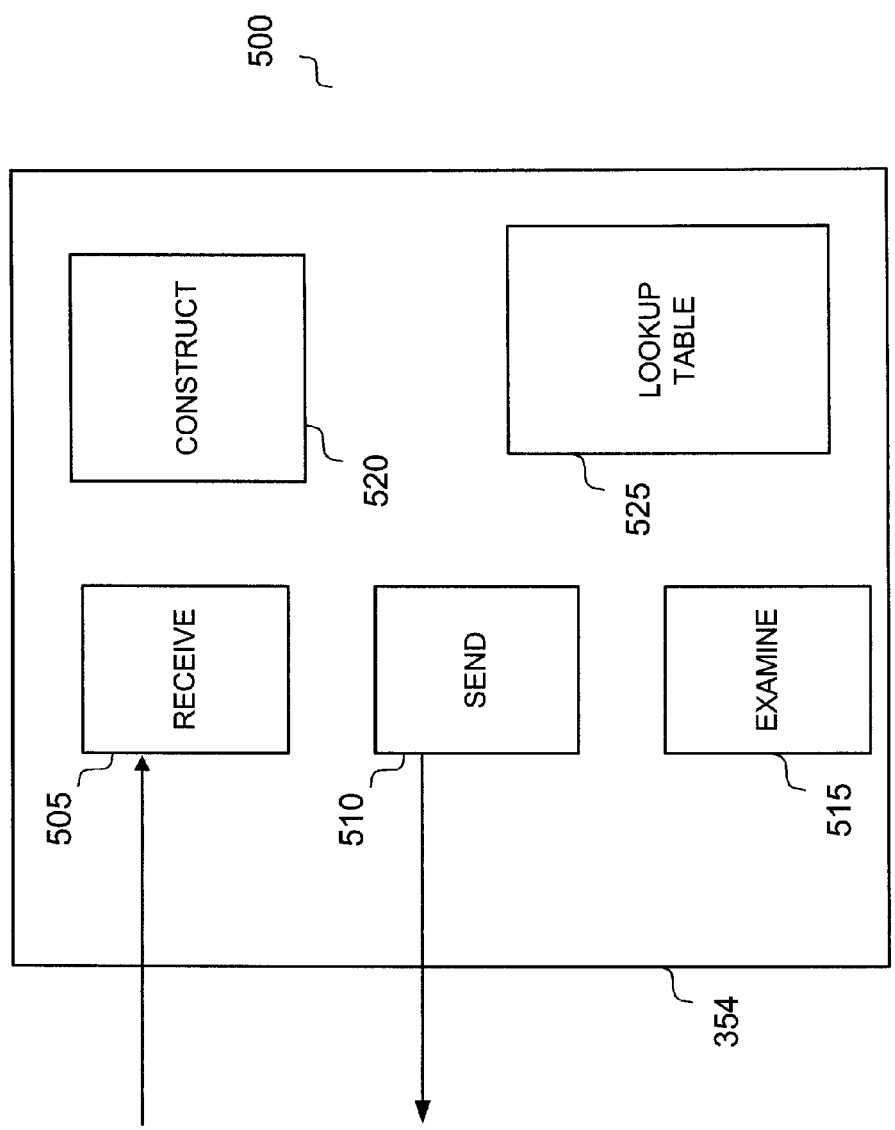
FIG. 5 is a block diagram depicting exemplary components of a bundle repository, in accordance with embodiments of the invention.
Figure 6:
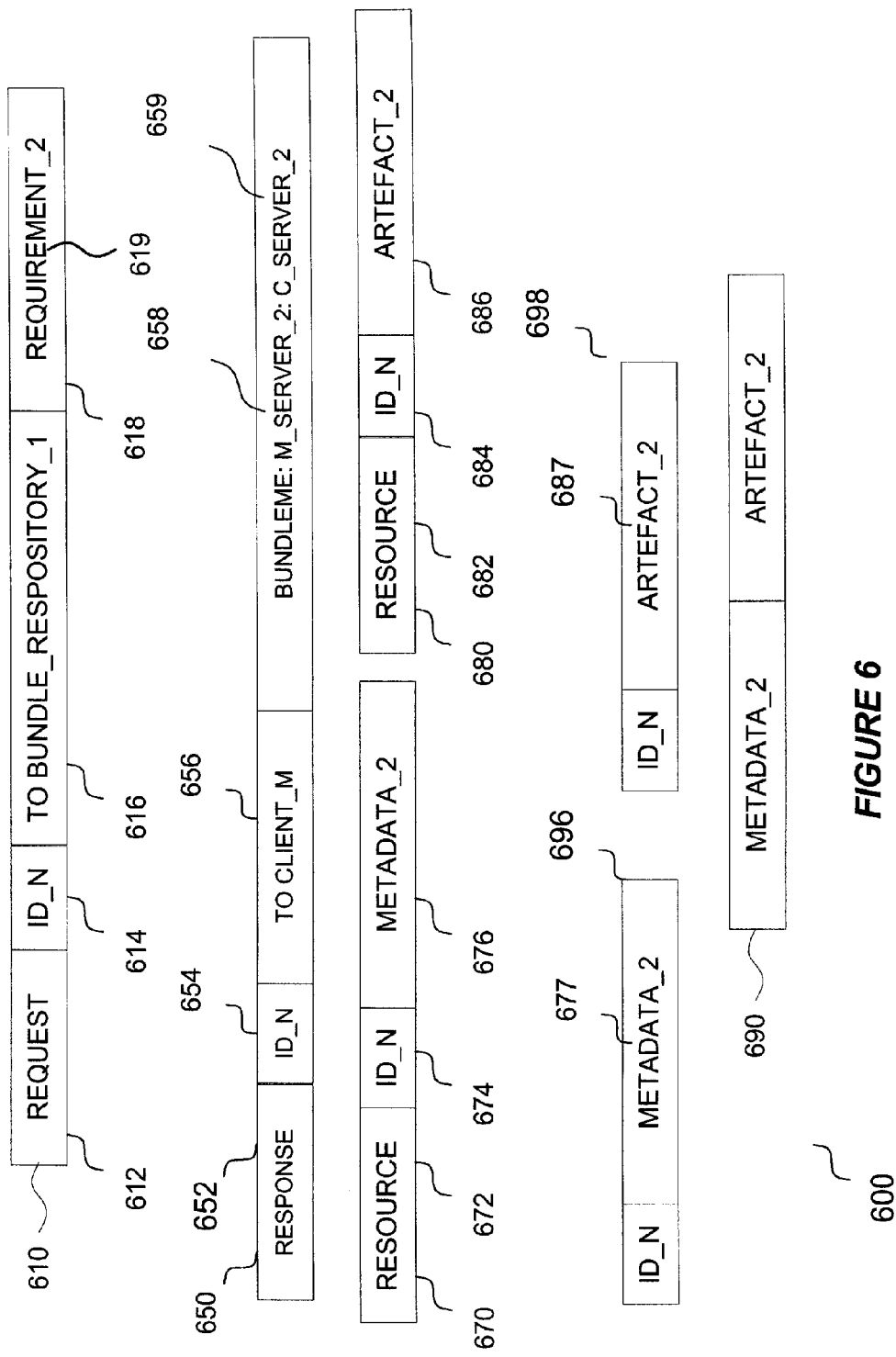
FIG. 6 depicts exemplary messages and tables depicting information used in methods of embodiments of the invention.

FIG. 3, which should be read in conjunction with FIGS. 4 to 7, is a high-level exemplary schematic flow diagram 300 depicting operation method steps for requesting bundle resources, in accordance with an embodiment of the present invention. FIG. 4 depicts system components 400 used in the method steps of FIG. 3, in accordance with an embodiment of the present invention. FIG. 5 is a block diagram 500 depicting exemplary components of a bundle repository 354, in accordance with an embodiment of the present invention. FIG. 6 depicts exemplary messages and tables 600 depicting information used in the method of FIG. 3, in accordance with an embodiment of the present invention. FIG. 7 depicts an exemplary lookup table 525 depicting information used in the method of FIG. 3, in accordance with an embodiment of the present invention.

To illustrate the present invention, a bundle resource creation example will be used. The skilled person will appreciate that the present invention is equally applicable to other migration scenarios. A client application 123 running on a client workstation 120 needs a bundle resource 690 that is characterized by an application requirement 619 "REQUIREMENT_2". The bundle resource 690 comprises metadata resource 677 "METADATA_2" and artifact resource 687 "ARTIFACT_2". Client application 123, 423 uses a client apparatus 124 designated "CLIENT_M". The bundle resource 690 is designated as "RESOURCE_2" by an associated bundle repository 154, 354. The associated bundle repository 154, 354 is designated "BUNDLE_REPOSITORY_1". The metadata resource 677 is to be found on metadata server 164, 464 "M_SERVER_2", and artifact resource is to be found on artifact server 174, 474 "C_SERVER_2".

The method starts at step 301. At step 302, a client application 123, 423 calls a client apparatus 124. A repository service component 416 of the client apparatus 124 prepares a requirement message 610. At step 303, a send component 412 of the client apparatus 124 sends the requirement message 610 to the bundle repository 154, 354 asking for a bundle resource that satisfies the requirement 619. The requirement message 610 comprises: a request type field 612, signifying the type of the message 610; an identification field 614, signifying an identification code; an address field 616, signifying an address for the message 610; and a requirement field 618, signifying a requirement 619 to be satisfied. In the example of FIG. 6, the requirement message 610 comprises: an identification code of "ID_N" for tracking the transaction; an address field of "BUNDLE_REPOSITORY_1" for sending to the bundle repository 154, 354; and the requirement 619 for the resource of "REQUIREMENT_2" 619 in the requirement field 618. A requirement could be for a Java package. An example of a requirement 619 for a bundle resource 690 is to provide a bundle resource that provides the org.apache.aries.util package from version 1.0, up to but excluding version 2.0. The skilled person will appreciate that there are many different requirements that could needed.

At step 304, a receive component 505 of the addressed bundle repository 154, 354 receives the requirement message 610. The addressed bundle repository 154, 354 processes the requirement message 610 and finds a matching bundle resource description that satisfies the requirement 619. At step 306, an examine component 515 of the bundle repository 154, 354 examines the requirement message 610 to determine its parameters. At step 308 the examine component 515 uses a lookup table 525 to find a bundle resource that satisfies the requirement 619. Lookup table 525 depicts an exemplary lookup table 525 for finding a bundle resource that satisfies the requirement 619. The lookup table 525 comprises: a requirement column 732; a resource column 734; a metadata location column 736; and an artifact resource location column 738. The lookup table 525 also comprises a set of entries 742, 744. For example, in entry 742, "REQUIREMENT_2" 619 is satisfied by "RESOURCE_2", which has its metadata resource 677 found at metadata server "M_SERVER_2" 164, 464, and its artifact resource 687 at artifact resource server "C_SERVER_2" 174, 474.

In a case when a requirement 619 is satisfied by more than one resource (not shown), the examine component 515 chooses one of the satisfying bundle resources according to a predefined algorithm. In an alternative embodiment all bundle resources 690 satisfying the requirement 619 are created at the client apparatus 124. The client apparatus 124 decides whether to use one, none, or all of the bundle resources 690.

In the case of entry 644, the location of "RESOURCE_3" cannot be found in the lookup table 525 directly, but can be found in a further server "R_SERVER_3".

In an embodiment, the lookup table 525 comprises a well-defined data format. In this context a "well-defined" data format refers to an extensible description data format for providing relevant details for possible migration destinations. Such a format is understood by bundle repository 154, 354. In an embodiment a machine readable format such as Extensible Markup Language (XML) is used.

At step 310 a construct component 520 constructs a response message 650.

The response message 650 comprises: a type field 652, signifying the type of the message 650; an identification field 654, signifying the identification code; an address field 656, signifying an address for the message 650; a metadata location field 658, signifying the location of the metadata server 164, 464 where the metadata resource 677 is to be found; and, an artifact location field 659 signifying the location of the artifact server 174, 474 where the artifact resource 687 is to be found. In the example of FIG. 6, the response message 650 comprises: the identification code of "ID_N" for tracking the transaction; an address field of "CLIENT_M" for sending to the client apparatus 124; a metadata server 164, 464 of "M_SERVER_2" as the metadata resource location; and, an artifact server 174, 474 of C_SERVER_2" as the artifact resource location.

In an embodiment the response message 650 comprises a bundle resource description comprising a location uniform resource locator (URL) for obtaining the bundle. To signify to the client apparatus 124 that the response message 650 comprises such a description, in the embodiment, the URL starts with "bundleme". By using "bundleme" to signify such a description, typical Hypertext Transfer Protocol (HTTP) networking protocols can be used. Other methods to signify that such a URL scheme is being used could be used other than using "bundleme". In the embodiment, the response message 650 comprises a single URL back to the client apparatus 124. The use of "bundleme" is a mechanism for identifying on the client 120 that the client apparatus 124 needs to fetch the parts of the bundle resource 690 (that is, the metadata resource 677 and the artifact resource 687) and process them in the client apparatus 124. The mechanism for processing URL schemes is through URL handler services. The URL handler service 420 of the present invention handles the URL scheme for "bundleme". The URL handler service 420 fits into the existing client mechanism and is therefore called normally using existing protocols.

At step 312, a send component 510 of the bundle repository 154, 354 sends the response message 650 to a receive component 414 of the client apparatus 124.

At step 314, the receive component 414 of the client apparatus 124 receives the response message 650. The service component 416 selects an appropriate URL handler service 420 to handle the URL schema used in the response message 650. There may be a plurality of URL handler services 420 available to the client apparatus 124. Only one is depicted in FIG. 4. At step 316, an analyze component 422 of the URL handler service 420 of the client apparatus 124 analyses the response message 650 to determine that the response message 650 comprises a bundle resource description and location and its parameters. The URL handler service 420 processes the new scheme to load the bundle. At step 318, a create component 424 of the URL handler service 420 of the client apparatus 124 creates a metadata resource request 670 for the metadata resource 677 and an artifact resource request 680 for the artifact resource 687. At step 320, the send component 412 of the client apparatus 124 sends the metadata resource request 670 to the server identified in the first response message 650, in this case to the metadata resource server 164, 464, and the artifact resource request 680 to the server identified in the response message 650, in this case to the artifact resource server 174, 474, respectively. The metadata resource request 670 and the artifact resource request 680 may be distinguished by URL query parameters, allowing metadata resource and artifact resource requests to be distinguished in the case where the metadata resource server 164, 464 and the artifact resource server 174, 474 are the same. The metadata resource request 670 and the artifact resource request 680 are directed through a HTTP redirect process to the metadata resource server 164, 464 and the artifact resource server 174, 474.

The metadata resource server 164, 464 extracts the requested metadata resource 677 from a metadata store 466, and sends the extracted metadata resource 677 to the client apparatus 124 in a metadata reply 696. The metadata reply comprises the metadata resource 677 and the identification "ID_N" to assist the URL handler service 420 track the transaction. The artifact resource server 174, 474 extracts the requested artifact resource 687 from an artifact store 476, and sends the extracted artifact resource 687 to the client apparatus 124 in an artifact reply 698. The artifact reply comprises the artifact resource 687 and the identification "ID_N" to assist the URL handler service 420 track the transaction.

At step 322 the receive component of the client apparatus 124 receives either the metadata resource 677 from the metadata resource server 164, 464, or the artifact resource 687 from the artifact resource server 174, 474. The received resource 677, 687 is stored locally by a store component of a collect component 430 of the client apparatus 124. At step 324, an evaluate component 432 of the collect component 430 evaluates the received resource 677, 687 from step 322 to determine whether it is a metadata resource 677 or an artifact resource 687.

At step 326, the evaluate component 432 determines whether the identification of the received resource "ID_N" 677, 687 matches the identification of a previously received resource 677, 687, so that a metadata resource 677 can be paired up with its corresponding artifact resource 687. If the identification of the received resource "ID_N" 677, 687 does not match, control passes back to step 322 to await the arrival of a matching resource 677, 687. If the identification of the received resource "ID_N" 477, 487 does match, the matching resource 477, 487 has already been received, and control passes to step 328.

At step 328, a combine component 434 of the collect component 430 combines the metadata resource 677 with its matching artifact resource 687 to create the bundle resource 690.

At step 330 the client apparatus 124 passes the bundle resource 690 to the application 123, 423. The method ends at step 399.

In an embodiment the client apparatus 124 is part of the operating system 122 running on the client workstation 120. In an alternative embodiment, the client apparatus 124 is provided as part of the client application 123, 423. In an embodiment, the client apparatus components 412, 414, 416, 420, 430 are collocated in the same client apparatus 124 on the same workstation 120. In alternative embodiments, client apparatus components 412, 414, 416, 420, 430 are located in a plurality of interacting client apparatuses 124 and/or on different workstations 120. It will be appreciated by the skilled person that the client apparatus 124 could be provided in a number of the software stack components running on the workstation 120.

In an embodiment the invention is described in terms of OSGi technologies. In an alternative embodiment it is applicable to other modularity technologies, such as the proposed module system for Java 8.

In an alternative embodiment the URL scheme of the response message 650 is a compound URL, essentially two URLs concatenated together which are separated and used for the metadata resource request 670 and for the artifact resource request 680.

In an embodiment, the bundle repository 154, 354 comprises OSGi Bundle Repository (OBR) Services, which is an OSGi Service that is a front end to a real repository (that can potentially be remote).

In an alternative embodiment, the metadata resource 677 itself comprises the location of the artifact resource 687. The lookup table 525 only comprises the location of the metadata resource 677 and not the artifact resource 687. The bundle repository 154, 354 creates a response message 650 that identifies the location of the metadata resource 677. Following receipt of the response message 650, the client application 124 creates a request for the metadata resource 677 from the metadata store 466. The metadata server returns the metadata resource 677 to be used to create the bundle resource 690. Following receipt of the metadata resource 677, the client apparatus 124 interprets the metadata resource 677 to identify the location of the artifact resource 687. The client apparatus 124 creates an artifact resource request 680. The artifact server 174, 474, 574 returns the artifact resource 687 to be converted to a bundle resource 690. The client apparatus 124 then uses the two pieces of information to create the OSGi bundle resource 690.

In one embodiment, the bundle repository 154, 354, the metadata store 466, and the artifact store 476 are located on separate servers. In another embodiment, the bundle repository 154, 354, and the metadata store 466 are located on the same server 154, 454, 464.

In an alternative embodiment the metadata store 466 and the artifact store 476 are located on the same servers 464, 474. In this case, the response message 650 comprises a single location designation for both the metadata resource 677 and the artifact resource 687, and an identification (not shown) so that the URL handler service 420 can create the necessary metadata resource request 670 and artifact resource request 680.

In the embodiment, a new URL schema is used. In an alternative embodiment additional information is encoded into the existing URL schema and existing URL handler services updated to handle the additional information.

In an embodiment, bundle resources 690, metadata resources 677, and artifact resources 687 are stored (cached) in the client apparatus 124. After step 302, the client apparatus 124 checks whether a cached version of a required bundle resource 690, and/or metadata resource 677, and/or artifact resource 687 are available for use. Using a cached resource avoids a need to fetch the resource from an external server 464, 474.

Embodiments have been described using OSGi bundles as an example only. The person skilled in the art will also appreciate that the present invention is equally applicable to the creation of other bundled resources, where the resource comprises an artifact resource and an associated metadata resource, for example, a Jigsaw Java module. A bundle resource can correspond to any unit of modularity from any other modularity technology.

In an alternative embodiment the first request 610 is for multiple bundle resources 690, or the first response 650 indicates multiple candidate bundle resources 690 that satisfy the requirement 619. The client may then want all of the bundle resources 690 or just a subset.

For the avoidance of doubt, the term "comprising", as used herein throughout the description and claims is not to be construed as meaning "consisting only of".

What is claimed is:

1. A method for creating a bundle resource at a client computer comprising:
    sending a first request from the client computer to a first location, wherein the first request comprises a request for the bundle resource;
    receiving a first response from the first location at the client computer, wherein the first response includes resource location information identifying a second location containing a metadata resource of the bundle resource, and a processing identifier indicating a type of information within and processing of the first response;
    in response to receiving the first response and the processing identifier indicating individual retrieval of bundle resource components based on the information in the first response, analysing the first response at the client computer to identify the second location;
    creating a second request and a third request at the client computer based on the information in the first response, wherein the second request comprises a request for the metadata resource of the bundle resource, and the third request comprises a request for an artifact resource of the bundle resource;

sending from the client computer the second request to the second location, and the third request to a third location;

receiving a second response and a third response at the client computer, wherein the second response comprises the metadata resource, and the third response comprises the artifact resource;

evaluating the second response at the client computer to determine the metadata resource, and evaluating the third response at the client computer to determine the artifact resource; and creating the bundle resource at the client computer.

2. The method of claim 1, wherein the step of creating the bundle resource comprises the step of combining the metadata resource and the artifact resource to create the bundle resource.

3. The method of claim 1, wherein the resource location information of the first response further identifies the third location, and the method further comprises the step of, in response to receiving the first response and the processing identifier indicating individual retrieval of bundle resource components, analysing the first response to identify the third location.

4. The method of claim 1, wherein the metadata resource identifies the third location, and wherein the method further comprises the step of evaluating the second response to identify the third location.

5. The method of claim 1, wherein the step of creating the bundle resource comprises one of:
combining the metadata resource and a cached artifact resource; and
combining a cached metadata resource and the artifact resource.

6. The method of claim 1, wherein the metadata resource comprises metadata of the artifact resource.

7. The method of claim 1, wherein the step of sending a first request to a first location comprises a step of sending a first request to a bundle repository.

8. The method of claim 7, wherein the step of sending a first request to a bundle repository comprises sending a first request to an OSGi bundle repository.

9. The method of claim 1, wherein the second location is the third location, and wherein the second request is not the third request.

10. The method of claim 1, wherein the second location is the first location.

11. The method of claim 1, wherein one or more from a group of the first request, the second request, the third request, the first response, the second response, and the third response comprise a uniform resource locator, url, and scheme.

12. A method for managing a bundle resource at a server comprising:
receiving a first request from a client computer, wherein the first request comprises a request for the bundle resource;
examining the first request to determine the bundle resource, and identifying a second location of a metadata resource associated with the bundle resource;
constructing a first response, wherein the first response includes resource location information identifying the second location containing the metadata resource of the bundle resource, and a processing identifier indicating a type of information within and processing of the first response; and
sending the first response to the client computer with the processing identifier indicating individual retrieval of bundle resource components to direct the client computer to individually retrieve the bundle resource components based on the information in the first response.

13. The method of claim 12, wherein the first response further identifies a third location of an artifact resource of the bundle resource.

14. A computer program product comprising:
one or more computer-readable, tangible storage devices;
program instructions, stored on at least one of the one or more storage devices, to send a first request to a first location, wherein the first request comprises a request for the bundle resource;
program instructions, stored on at least one of the one or more storage devices, to receive a first response from the first location, wherein the first response includes resource location information identifying a second location containing a metadata resource of the bundle resource, and a processing identifier indicating a type of information within and processing of the first response;
program instructions, stored on at least one of the one or more storage devices, to in response to receiving the first response and the processing identifier indicating individual retrieval of bundle resource components based on the information in the first response, analyze the first response to identify the second location;
program instructions, stored on at least one of the one or more storage devices, to create a second request and a third request based on the information in the first response, wherein the second request comprises a request for the metadata resource of the bundle resource, and the third request comprises a request for an artifact resource of the bundle resource;
program instructions, stored on at least one of the one or more storage devices, to send the second request to the second location, and the third request to a third location;
program instructions, stored on at least one of the one or more storage devices, to receive a second response and a third response, wherein the second response comprises the metadata resource, and the third response comprises the artifact resource;
program instructions, stored on at least one of the one or more storage devices, to evaluate the second response to determine the metadata resource, and evaluating the third response to determine the artifact resource; and
program instructions, stored on at least one of the one or more storage devices, to create the bundle resource.

15. The computer program product of claim 14, wherein the program instructions to create the bundle resource combine the metadata resource and the artifact resource to create the bundle resource.

16. The computer program product of claim 14, wherein the resource location information of the first response further identifies the third location, and the program instructions, in response to receiving the first response and the processing identifier indicating individual retrieval of bundle resource components, analyze the first response to identify the third location.

17. The computer program product of claim 14, wherein the metadata resource identifies the third location, and wherein the program instructions evaluate the second response to identify the third location.

18. The computer program product of claim 14, wherein program instructions create the bundle resource by one of:
combining the metadata resource and a cached artifact resource; and
combining a cached metadata resource and the artifact resource.

19. The computer program product of claim 14, wherein the metadata resource comprises metadata of the artifact resource.

20. The computer program product of claim 14, wherein the program instructions send a first request to a bundle repository.

21. The computer program product of claim 20, wherein program instructions send a first request to an OSGi bundle repository.

22. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to send a first request to a first location, wherein the first request comprises a request for the bundle resource;
program instructions, stored on at least one of the one or more storage devices for execution by at least one of the one or more processors via at least one of the one or more memories, to receive a first response from the first location, wherein the first response includes resource location information identifying a second location containing a metadata resource of the bundle resource, and a processing identifier indicating a type of information within and processing of the first response;
program instructions, stored on at least one of the one or more storage devices for execution by at least one of the one or more processors via at least one of the one or more memories, to in response to receiving the first response and the processing identifier indicating individual retrieval of bundle resource components based on the information in the first response, analyze the first response to identify the second location;
program instructions, stored on at least one of the one or more storage devices for execution by at least one of the one or more processors via at least one of the one or more memories, to create a second request and a third request based on the information in the first response, wherein the second request comprises a request for the metadata resource of the bundle resource, and the third request comprises a request for an artifact resource of the bundle resource;
program instructions, stored on at least one of the one or more storage devices for execution by at least one of the one or more processors via at least one of the one or more memories, to send the second request to the second location, and the third request to a third location;
program instructions, stored on at least one of the one or more storage devices for execution by at least one of the one or more processors via at least one of the one or more memories, to receive a second response and a third response, wherein the second response comprises the metadata resource, and the third response comprises the artifact resource;
program instructions, stored on at least one of the one or more storage devices for execution by at least one of the one or more processors via at least one of the one or more memories, to evaluate the second response to determine the metadata resource, and evaluating the third response to determine the artifact resource; and
program instructions, stored on at least one of the one or more storage devices for execution by at least one of the one or more processors via at least one of the one or more memories, to create the bundle resource.

23. The computer system of claim 22, wherein the program instructions to create the bundle resource combine the metadata resource and the artifact resource to create the bundle resource.

24. The computer system of claim 22, wherein the resource location information of the first response further identifies the third location, and the program instructions, in response to receiving the first response and the processing identifier indicating individual retrieval of bundle resource components, analyze the first response to identify the third location.

25. The computer system of claim 22, wherein the metadata resource identifies the third location, and wherein the program instructions evaluate the second response to identify the third location.

* * * * *